United States Patent [19]
Teichner et al.

[11] Patent Number: 5,245,413
[45] Date of Patent: Sep. 14, 1993

[54] METHOD AND APPARATUS FOR GENERATING A SPIRAL CURVE TELEVISION TEST PATTERN FOR TESTING ADVANCED TELEVISION SYSTEMS

[75] Inventors: Detlef Teichner, Villingen, Fed. Rep. of Germany; Jörg Böhmert, Greenwich, Conn.

[73] Assignee: North American Philips Corporation, New York, N.Y.

[21] Appl. No.: 804,568

[22] Filed: Dec. 10, 1991

[51] Int. Cl.[5] ............... H04N 17/00; H04N 17/02
[52] U.S. Cl. ................................. 358/10; 358/139; 345/2
[58] Field of Search ............... 358/10, 139; 340/717, 340/743, 747; 324/404; 315/378

[56] References Cited

U.S. PATENT DOCUMENTS

| | | | |
|---|---|---|---|
| 3,230,304 | 1/1963 | Schonfelder | 358/10 |
| 4,635,096 | 1/1987 | Morgan | 358/10 |
| 4,914,506 | 4/1990 | Kafer et al. | 358/10 |
| 5,115,229 | 5/1992 | Shalit | 340/717 |

Primary Examiner—James J. Groody
Assistant Examiner—Glenton B. Burgess
Attorney, Agent, or Firm—Michael E. Marion

[57] ABSTRACT

A test pattern suitable for testing high definition (HDTV) television signals is described as well as a method and apparatus for providing such a pattern on a television display apparatus. A plurality of color signals are stored in a memory device (look-up table) and each pixel of the display screen is correlated to a point on a spiral curve in order to determine a rotational angle which is used as an address for one or more of said color signals which are displayed at that pixel location. In this manner, a spiral shaped test pattern is generated having spiral color (or monochrome) segments corresponding to a spiral curve.

4 Claims, 7 Drawing Sheets

METHOD AND APPARATUS FOR GENERATING A SPIRAL CURVE TELEVISION TEST PATTERN FOR TESTING ADVANCED TELEVISION SYSTEMS

BACKGROUND OF THE INVENTION

Conventional procedures for testing and measuring the performance of television equipment are not suitable for a full evaluation of all effects which can be introduced by complex digital signal processing in advanced television systems (ATV). Currently used test procedures, which were developed for conventional television (e.g. NTSC) environments, are not adequate for testing and evaluating newly proposed ATV systems comprising for example, high definition (HDTV), improved definition (IDTV) and enhanced definition (EDTV) television receivers and displays. In such systems, advanced processing circuits comprising adaptive filters and companding techniques, are subject to threshold problems and depend heavily on picture detail. In addition, the extensive use of field/frame delays can introduce motion artifacts. Evaluation of these advanced systems therefore requires the observation of systems both in the frequency and time domains.

Procedures used for testing conventional television systems rely on the use of stationary test images such as resolution charts, geometrical patterns and color bars. These procedures cannot reveal distortions of moving detail, caused by filtering techniques used in some of the ATV systems, nor can they reveal other artifacts occurring as a result of temporal processing which can only be identified in connection with varying levels of luminance contrast and color saturation, a wide variety of color transitions and variable positioning of test pictures on the TV screen.

The object of the instant invention is to provide the means for testing a combination of the most important parameters associated with advanced television systems.

SUMMARY OF THE INVENTION

The instant invention comprises a method and apparatus for generating a test pattern display which provides color or black and white segments which follow a spiral curve wherein certain luminance and color values are assigned to different portions of the spiral segments. The spiral pattern generated in accordance with the instant invention can provide stationary or moving edges in all slopes. In a moving pattern embodiment, the spiral segments seem to contract towards or expand from the center. The changing shape of the spiral results in different speeds of motion for the moving edges. In another embodiment these values can be made to change over elapsing time. A further embodiment of the invention can provide a pattern in which over time, all significant combinations of colored edges with different luminance contrasts and color saturations can encounter all significant slopes and speeds of motion.

The embodiments described herein, utilize derivative patterns with restricted parameter sets for selected representative tests. The invention comprises other embodiments including a monochrome moving spiral which can reveal substantially all spatial and temporal step responses for substantially all luminance contrasts, and a moving color spiral which provides a variety of color transitions at various angles for analysis in the spatial and time domain. Other embodiments are provided by the particular selection and number of colors chosen for display.

The so-called color bars (as standardized in several versions by the European Broadcasting Union and the Society of Motion Picture and Television Engineers) have found general use in television engineering. The same principle colors can be used in the color spiral of the invention, i.e. white, yellow, cyan, green, purple, red, blue and black. This will become clear in connection with the following description of the preferred embodiments. Many possible sets of colors can be used with the invention for different purposes, however.

The invention is pointed out with particularity in the appended claims. However, other objects and advantages, together with the operation of the invention, may be better understood by reference to the following detailed description taken in connection with the following drawings.

DESCRIPTION OF PREFERRED EMBODIMENTS OF THE INVENTION

The following preferred embodiments can be used for all kinds of television standards, including high definition television signals with progressive or interlaced line scan scanning.

The mathematical basis of spiral theory is explored in the following books: Mathematical Handbook, by M. Vygodsky (MIR Publishers, 1987); Handbook of Mathematics, by I. N. Bronshtein and K. A. Semendyayev (Verlag Harri Deutsch, 1979) which are incorporated by reference herein. As defined by Van Nostrand's Scientific Encyclopedia, a spiral is the locus of a point which moves about a fixed pole, while its radius and its vectorial angle continually increases or decreases according to some law.

Figure 1A:
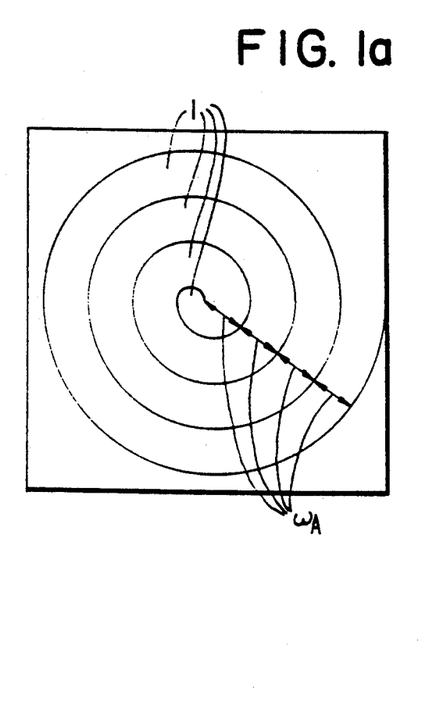
FIG. 1(a)–(d) show four examples of spiral test patterns according to the present invention.
Figure 1B:
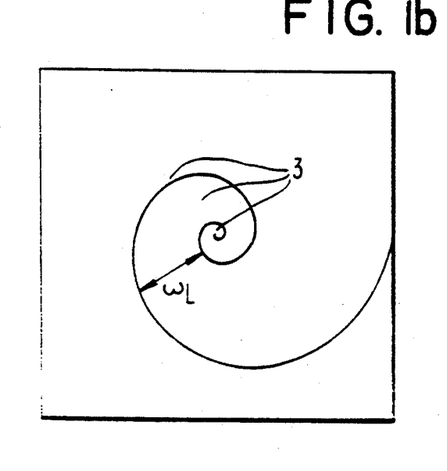
Figure 1C:
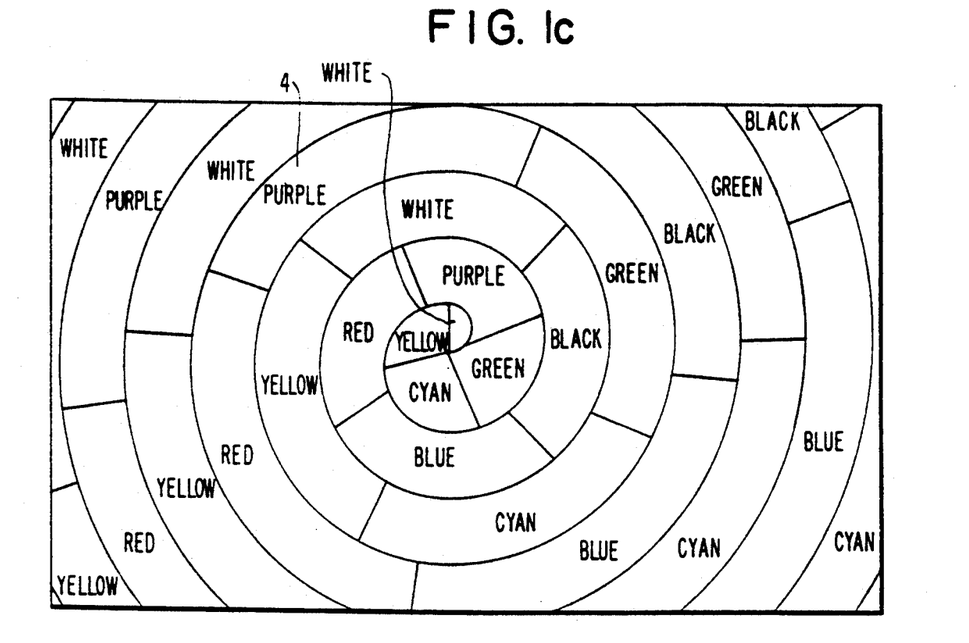
Figure 1D:
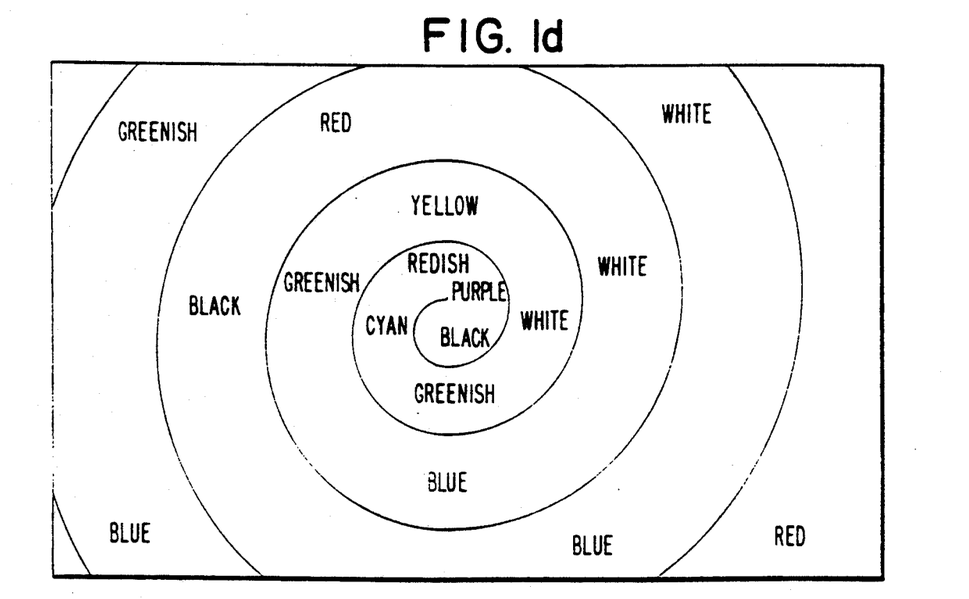

FIGS. 1(a)–(d) show several examples of spiral test patterns generated in accordance with the invention. FIG. 1(a) illustrates an Archimedean spiral curve with its center coinciding With the center of a screen. An Archimedean spiral test pattern is characterized by spiral segments 1 each having an equal width $W_A$ along the radius of the spiral curve. FIG. 1(b) illustrates a logarithmic spiral curve which is characterized by spiral segments 3 each having increasing widths $W_L$ along the radius of the spiral curve. Both drawings show spirals with positive phase (counter clockwise turns) although such spirals can have negative phase (clockwise turns) as well. FIG. 1(c) illustrates an Archimedean spiral embodiment of the invention as displayed on a television display having a 16:9 aspect ratio. Each spiral segment is divided into color segments 4 which are divided by sharp transitions in color. The sequence of colors shown follows the SMPTE color bars described above. FIG. 1(d) illustrates a logarithmic spiral embodiment of the invention as displayed on a television display having a 16:9 aspect ratio. Each spiral segment is also divided into color segments 5, however in this example the transition from one color to the next is gradual rather than sharp. The sequence of colors approximates the SMPTE color bar sequence. In both FIG. 1(c) and 1(d) the spirals are shown having their respective centers positioned at the center of the display. The center of the spiral can be positioned off-center however and still be within the province of the invention. Also, the Archimedean spiral can have color segments with gradual color transitions and the logarithmic spiral can have color segments with sharp color transitions. The colors displayed and their sequence are arbitrary and those shown herein are merely used as an example. A monochrome embodiment would use black and white for the displayed colors.

Figure 2A:
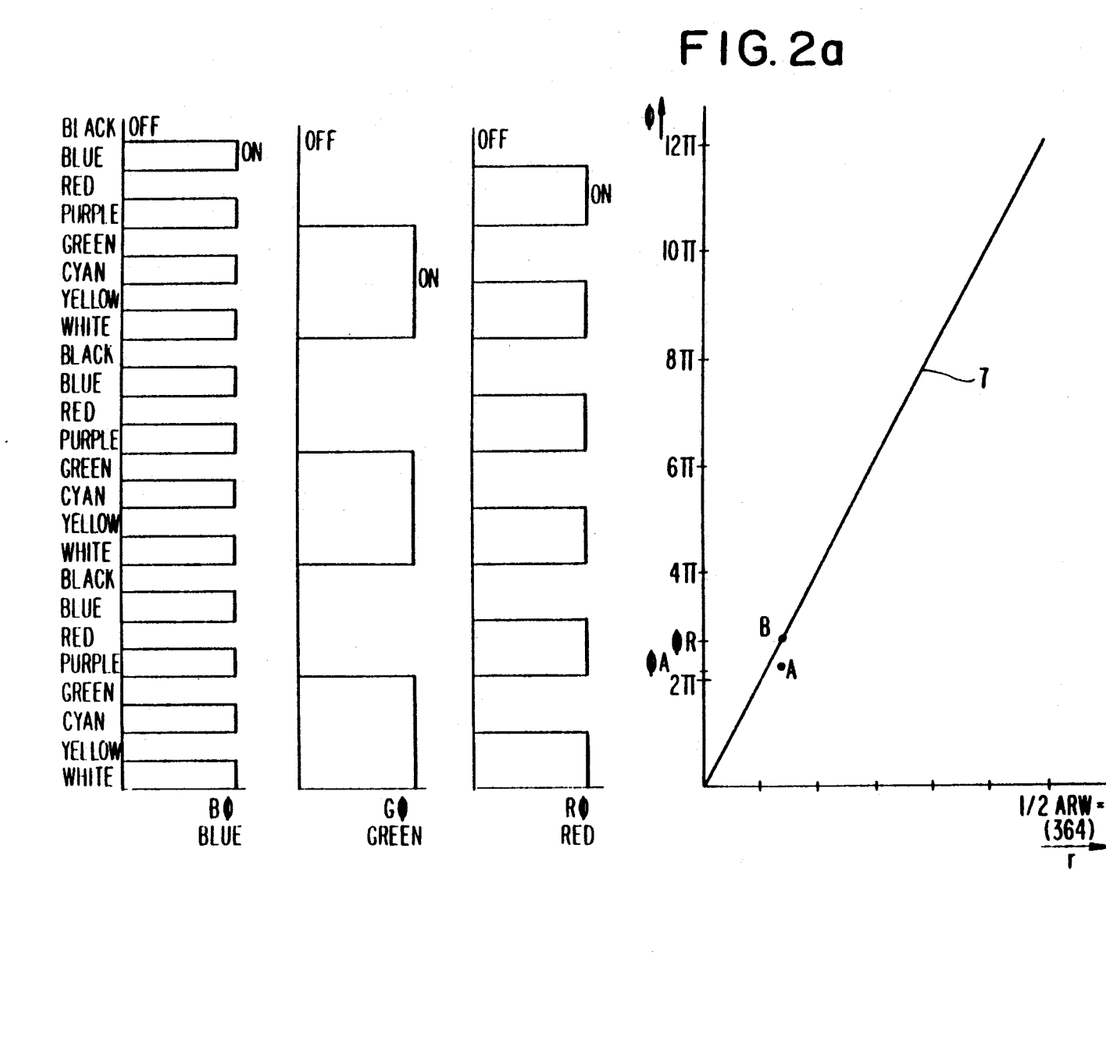
FIG. 2(a) illustrates graphically the functional relationships of the spiral equation and the mapping of color values to spiral segments following an Archimedean spiral curve.
Figure 2B:
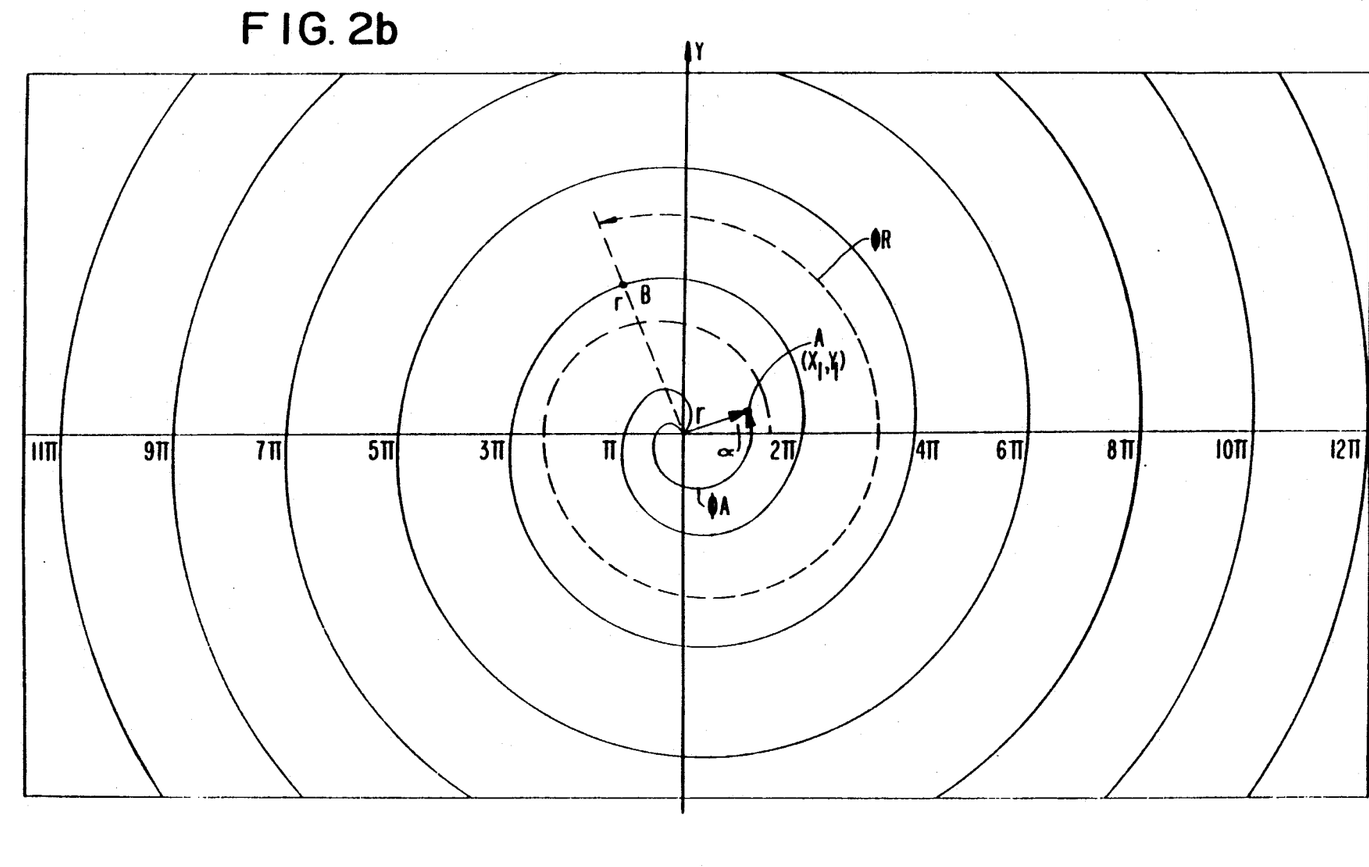
FIG. 2(b) illustrates test pattern described by FIG. 2(a)

FIG. 2(a) illustrates graphically a method for generating the Archimedean spiral test pattern shown in FIG. 1(c). FIG. 2(b) illustrates the pattern of FIG. 1(c) but omits the notation of color segment borders in order to clearly illustrate those parameters involved in practicing the invention.

As described by known spiral theory, the relationship between the radius of an Archimedean spiral curve at any point on the curve, and the number of complete rotations within the radius, is determined by the choice of an appropriate constant, c, as represented by the formula:

$$\phi(r) = c * r$$

where r is the radius of the spiral at that point on the curve, and the change in the rotational angle, $\phi$, is a linear function of r. In accordance with the invention the width and number of spiral segments for display on a given television display screen can be calculated with these values.

For the Archimedean spiral embodiment shown in FIG. 2(b), the relationship between the radius, r, the rotational angle $\phi_R$ and constant c can be shown by straight line 7 in FIG. 2(a) and can be expressed by the formula:

$$\phi_R = c * r$$

The invention comprises a method and apparatus for determining for each pixel of the display screen, one or more color signals in order to provide a spiral test pattern. The test pattern comprises a number of spiral segments which follow the spiral pattern set by the spiral curve. Each complete rotation of the spiral curve represents an angular rotation of $2\pi$ and these rotations of the curve represent the boundaries between each spiral segment. Each pixel as displayed on the display screen can be represented by rectangular coordinates as well as polar coordinates. The origin of the spiral shown in FIG. 2(b) for example has rectangular coordinates of 0,0, and each pixel can be described in rectangular coordinate form as a particular pixel (x) on a particular row (y). Each rectangular coordinate can be converted to its polar coordinate form and correlated with a relevant point on the spiral curve.

As part of the invention, a spectrum of colors to be displayed is chosen and stored as a number of color signals in an addressable memory. The rotational angle $\phi_A$ for each pixel of the display is calculated and correlated to a corresponding portion of the spiral curve defined by the user, and is used as an address to access those color signals in memory which will generate the desired color.

FIG. 2(a) illustrates three color signals, in this example, a blue signal B($\phi$), a green signal G($\phi$) and R($\phi$). These color signals could also be a luminance and two color difference signals. In this example, the look-up tables have been set up so that each respective color signal will be addressed ("ON") or not addressed ("OFF") for different portions of each rotation of the spiral curve, as indicated by the vertical axis, $\phi$. The tables have been set up to provide the sequence of colors indicated in the far left column of FIG. 2(a). Each color will be displayed by a pixel excited by the combination of "ON" signals shown. For example, point A in accordance with the method described below, is determined to have a rotational angle $\phi_A$ of $2.2\pi$. At this $\phi_A$ value, only the green signal is "OFF" and therefore the pixel will be purple. If FIG. 1(c) is compared to FIG. 2(b), it will be seen that this segment is in fact purple. In this manner, for each value of $\phi$ shown in FIG. 2(a), particular color signals in the three look-up tables can be found which will generate for the relevant pixels of the display screen, a desired color, and/or luminance signal. Methods useful for setting up the look-up tables and associated addressing algorithms are well-known in the programming art and will not be explored further therein.

By choosing a value c in accordance with known spiral theory, the pattern designer can define the number of full rotations a spiral curve (Archimedean) will have for a given radius and thereby, the number of spiral segments. The radius is correlated to the number of pixels and aspect ratio of the display.

The line 7 in FIG. 2(a) represents the relationship between the number of spiral segments desired and the corresponding $\phi$ for each pixel in those segments, as determined by the value c chosen by the designer. By performing the following operations for each pixel to be displayed, the stored signals comprising the color spectrum are addressed by the respective rotational angle $\phi$ determined for each pixel, thereby forming the desired spiral shaped color pattern.

Since the spiral segments represent the areas between the actual rotational portions of the curve, the constant c chosen also determines the width, $W_A$, of each spiral segment. For example, in the embodiments described herein, vector r (radius) of any polar coordinate can be measured in terms of the average picture width (APW) as indicated in the graph of FIG. 2(a). The maximum radius $r_t$ can be chosen by the pattern designer to equal ½ of the APW so that the diameter of the spiral pattern substantially fills the display. In the case of a conventional television picture, the APW is 728 pixels, therefore $r_t = $ ½ of the APW or 364 pixels. The constant c is chosen to reflect a desired number of spiral segments for the spiral across the APW.

In the example shown in FIG. 1(c) and 2(b) as described graphically in FIG. 2(a), $r_t = 364$. If the designer desires to have six segments (i.e. six complete rotations of the spiral) on each side of the center origin of the spiral, then he must multiply the number of segments, n, by $2\pi$ (which is $\phi$ for one complete rotation of the spiral) therefore $c=(n*2\pi)/r_t$, in this example $c=12\pi/364$ which for the sake of clarity is represented as line 7 in FIG. 2(a). Once the designer has chosen c, she can then store color signals in look up tables represented by $B(\phi)$, $G(\phi)$ and $R(\phi)$ shown in FIG. 2(a) with address values corresponding to values of $\phi$, from zero to $n*2\pi$, in the sequence desired.

In the embodiment described in FIGS. 1(c), 2(a) and 2(b), the pattern designer has chosen a sequence of colors which follow the SPTME color bars. Three color memories are symbolized by $B(\phi)$, $G(\phi)$ and $R(\phi)$, and the designer has provided for the presence or absence of each color signal at locations in each memory corresponding to a particular $\phi$ address, to generate the color indicated at the far left. It is to be understood that techniques for setting up such addressable memories are known to those skilled in the art and will not therefore be discussed herein. It is also to be understood that the number and periodicity of each signal can be varied with respect to the corresponding address value of $\phi$ by altering the set up of the look up tables.

For each pixel position, for example point A, having rectangular coordinates $x_1,y_1$ as shown in FIG. 2(b), a corresponding pair of polar coordinates can be found using the known techniques for calculating the vector (radius) r (i.e. the distance from point $x_1,y_1$ to the origin 0,0) and the vector angle $\alpha$ which can only have a value between 0 and $2\pi$. Having found the polar coordinates r and $\alpha$ for point A, the corresponding rotational angle $\phi_A$ is then determined to obtain the address needed to access the look up tables and obtain the desired color signals which are then applied to point A.

For the Archimedean spiral test pattern, the algorithm for calculating $\phi_A$ for the pixel at point A is as follows:

1. calculate r; $(r=\sqrt{(x_1^2+y_1^2)})$
2. calculate $\alpha$; $(\alpha=\arctan(y_1/x_1))$;
3. calculate the rotational angle for the point on the actual spiral curve which is at radius r (shown as point B on FIG. 2(b)) using the formula $\phi_R=r*c$;
4. calculate the number of full rotations n made by the spiral at point B by dividing $\phi_R$ by $2\pi$ and rounding to the lowest integer;
5. determine the correct spiral segment for point A by comparing $\phi_R$ and $\alpha+n*2\pi$. If $\alpha+n*2\pi$ is less than or equal to $\phi_R$ then $n_c=n+1$. If not then $n_c=n$;
6. calculate the value of $\phi_A$ to be used as an address for the look up tables by the formula $\phi_A=\alpha+n_c*2\pi$. The value of $\phi_A$ can then be used to address the appropriate values of B, G and R in the look up tables.

Figure 3A:
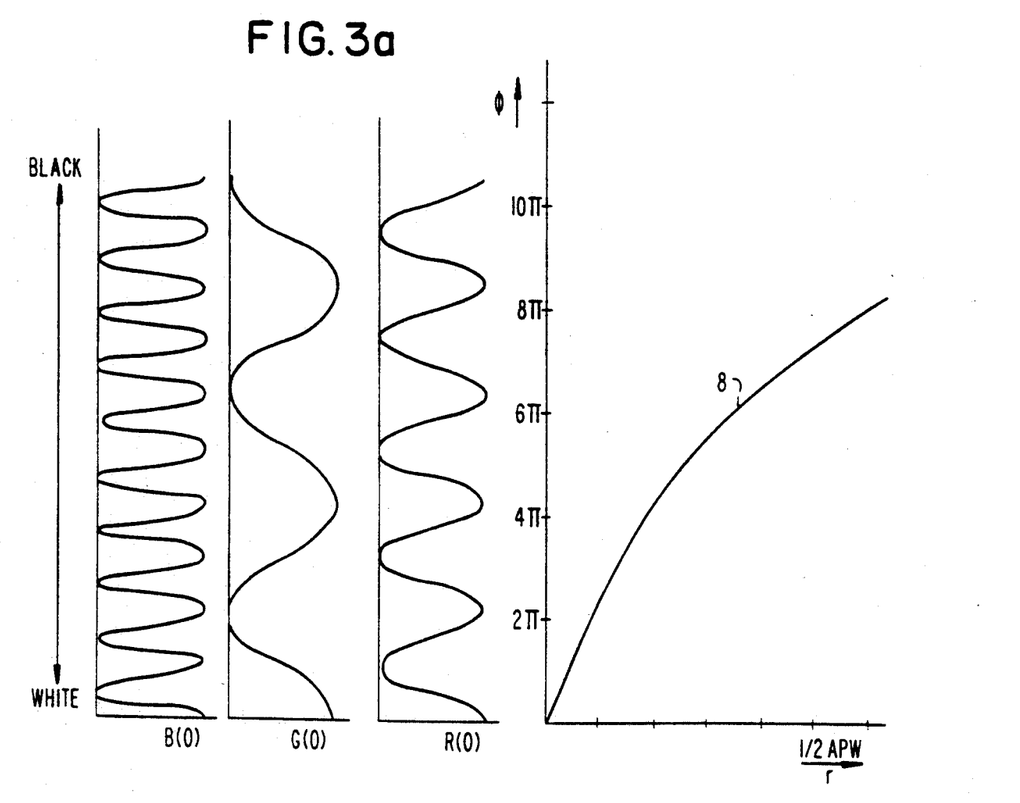
FIG. 3 illustrates relationships of the spiral equation and the mapping of color values to spiral segments following the logarithmic spiral curve of FIG. 1(d)
Figure 3B:
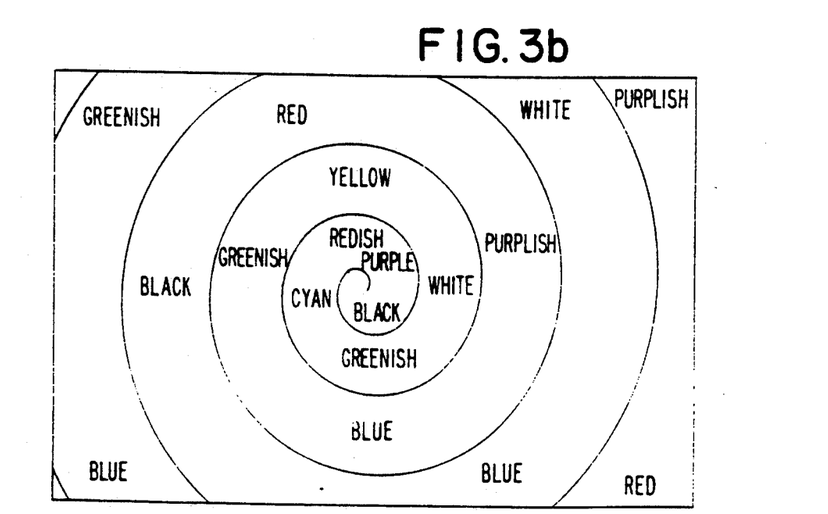
Figure 4A:
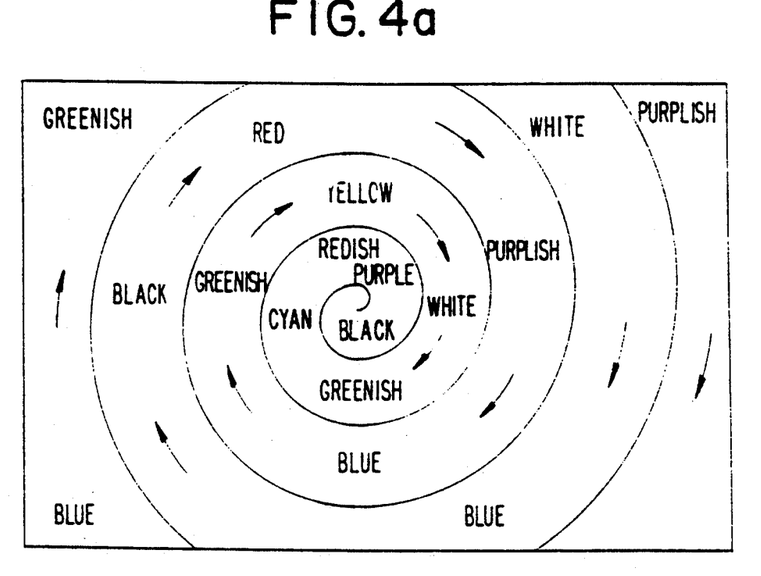
FIG. 4(a) illustrates one embodiment of a moving test pattern.
Figure 4B:
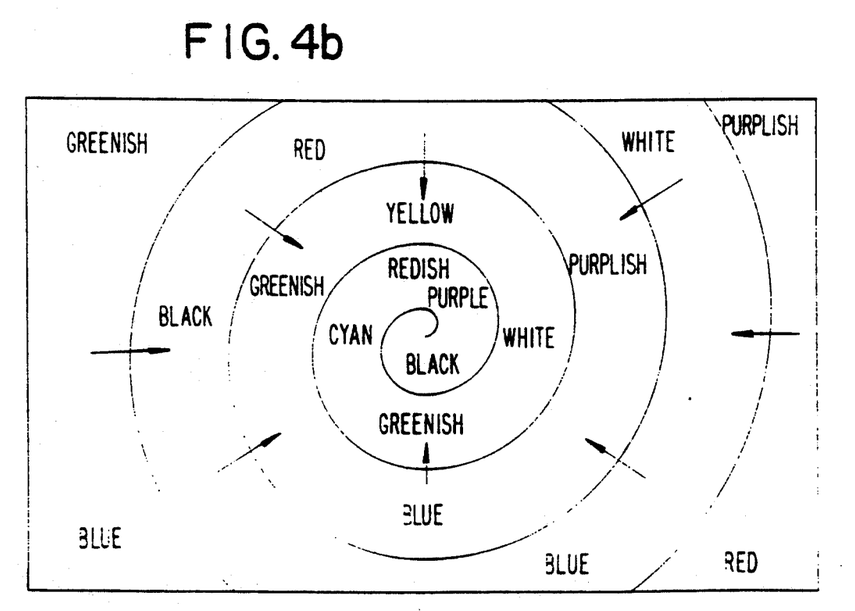
FIG. 4(b) illustrates a second embodiment of a moving test pattern.

Another example of a useful test pattern is given in FIG. 1(d). Here, a logarithmic spiral is shown having spiral segments 5 which follow the mathematical characteristic of the spiral and have widths which become respectively larger as they move away from the origin point. As indicated in FIG. 3, look up tables have been set up by the designer to provide three color signals which each vary in amplitude with respect to the value of $\phi$. The color segments of the displayed test pattern will gradually change from one color to the next rather than having sharp color borders as shown in the previous test pattern described above. FIG. 3 graphically illustrates the correlation between values of B, G and R color signals located respectively in look up tables $B(\phi)$, $G(\phi)$ and $R(\phi)$. Values of $\phi$ calculated for each pixel are used to address these look up tables to obtain the desired B, G, and R signals for the respective pixel. G, B and R values can be chosen to vary as sinusoidal functions, or any other suitable functions. The relationship between respective G, B and R signal periods then determines the sequence of colors.

The relationship between the rotational angle $\phi_R$ and the radius r for a logarithmic spiral curve is:

$$\phi_R = c1 * ln(1+c2*r).$$

Constants c1 and c2 are chosen to allow the spiral to bend and steepen the curve. For a given value of c1 a value for c2 can be calculated according to the formula:

$$c2 = \frac{1}{r_t}(e^{\frac{n*2\pi}{c1}} - 1).$$

If the value of c2 is given, the value for c1 can be calculated according to the formula:

$$c1 = \frac{n*2\pi}{ln(1+c2*r_t)},$$

where n = the number of desired turns in the displayed spiral pattern and $r_t$ = the maximum radius of the pattern as described above in connection with the Archimedean example.

For the logarithmic spiral, the algorithm for calculating $\phi$ for each pixel expressed as a rectangular coordinate is as follows:

1. calculate r; $(r=\sqrt{(x_1^2+y_1^2)}$;
2. calculate $\alpha$; $(\alpha=\arctan(y_1/x_1))$;
3. calculate the rotational angle for the point on the actual spiral curve which is at radius r using the formula:

$$\phi_R=c_1*ln(1+c_2*r);$$

4. calculate the number of full rotations n made by the spiral at this point by dividing $\phi_R$ by $2\pi$ and rounding to the lowest integer;
5. determine the correct spiral segment for the point by comparing $\phi_R$ and $\alpha+n*2\pi$. If $\alpha+n*2\pi$ is less than or equal to $\phi_R$ then $n_c=n+1$. If not then $n_c=n$;
6. calculate the value of $\phi A$ to be used as an address for the look up tables by the formula $\phi_A=\alpha+n_c*2\pi$. The value of $\phi_A$ can then be used to address the appropriate values of B, G and R in the look up tables.

As discussed above, the invention also comprises moving spiral test pattern embodiments. Movement in the spiral pattern is created by adding an incremental change to the rotational angle $\phi_R$ calculated in step 3 of the above listed sequences of steps.

Assuming that the designer wishes the logarithmic spiral pattern to rotate one full turn in two seconds, and the television system has a frame rate of 30 Hz., then 60 frames of test pattern must be generated to achieve a smooth spiral rotation. For each of the 60 frames, f, an increment of $2\pi/60$ is added to the value $\phi_R$ calculated for each frame. The sequence of steps 1 to 6, is repeated for f=1 to 60, where the formula in step 3 is:

$$\phi_R=c_1*ln(1+c_2*r)+f*(2\pi/60)$$

thereby generating a full rotation of the spiral pattern every two seconds.

An additional movement of the colors can be achieved by making the mapping of the colors time dependent. This can be done for example, by generating a number of frames, e.g. 60 as described above. The sequence of steps 1 to 6 is repeated for f=1 to 60 but with each frame f, the address locations of the color signals are shifted by a value $\Gamma$, which can have a fixed or changing value, for example $2\pi$. This can be accomplished, for example, by modifying the formula in step 6:

$$\phi_A = \alpha + n_c \cdot 2\pi + f \cdot \Gamma.$$

The value of $\phi_A$ can then be used to index the appropriate values of B, G and R in the look up tables. This results in a changing sequence of colors for each frame with respect to corresponding portions of the test pattern.

Figure 5:
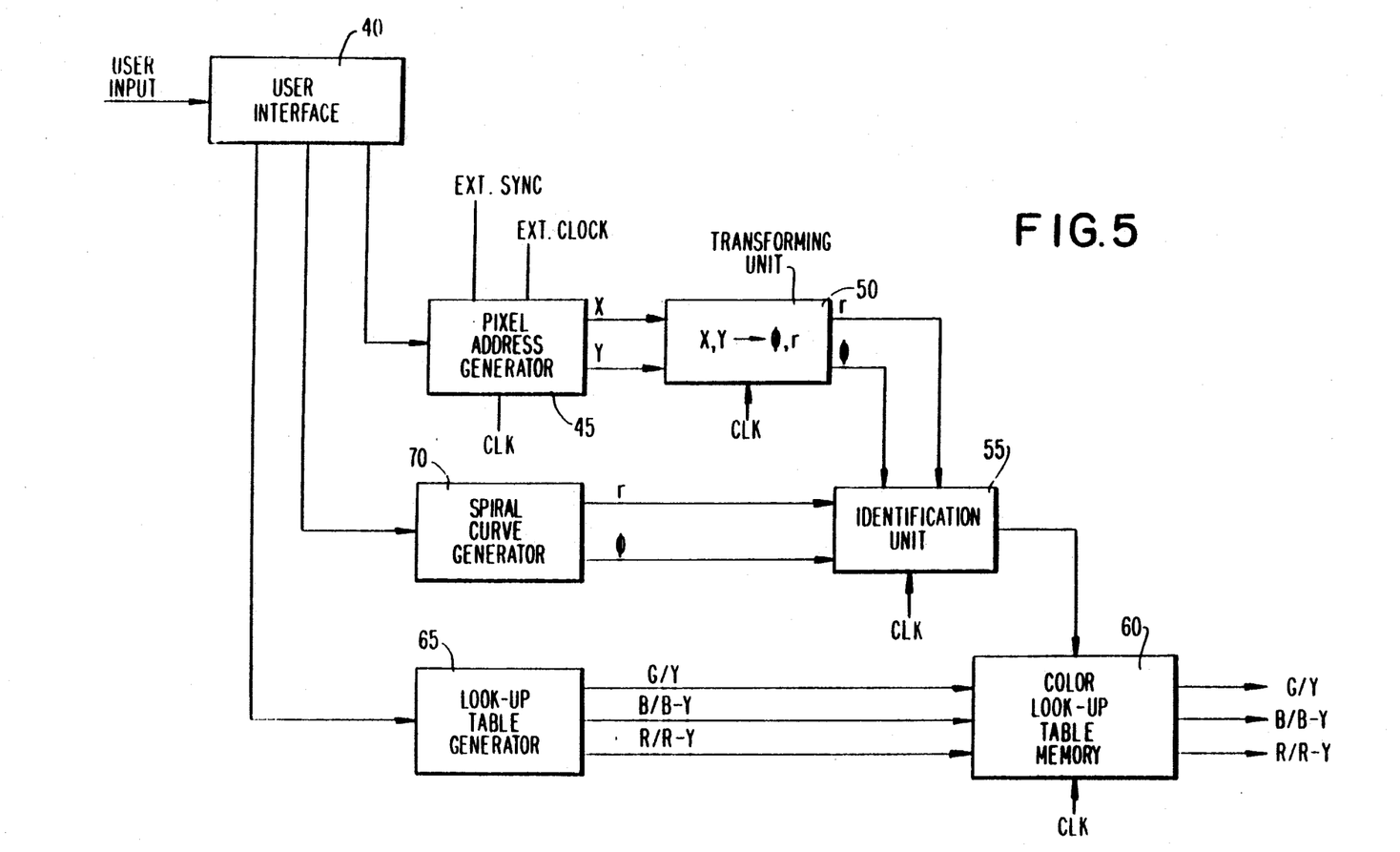
FIG. 5 shows a block diagram of an apparatus for generating color spiral patterns.

A block diagram of a generator for generating color spiral patterns is shown in FIG. 5. Using the user interface 40, which can be a keyboard, mouse, etc., the parameters of the TV standard (numbers of fields/frames per second, number of lines, pixels per line) and of the spiral test pattern desired (Archimedean/logarithmic), i.e. number of rotations, color parameters, and segment widths are entered into the system. Based on the TV standard parameters, a synchronizing unit determines pixel row and column coordinates (x,y) for every field (interlace) or frame (progressive scan TV standard), which are then converted into polar coordinate values in transforming unit 50. External or internal synchronization can be used as well as operation with external or internal clock.

In spiral curve generator 70, the spiral parameters ($\phi$,r) defining the boundaries between the spiral segments are calculated for the selected curve and stored in a memory. The $\phi/r$ values of each pixel are then compared to the stored values from generator 70, in identification unit 55, to identify the $2\pi$ period and the angle $\phi$ of each pixel. The output signal of this comparison is used to address look-up table 60, in which the values of the color signal function are stored (f.e. CBR or Y, B−Y, R−Y for color bar sequence). These look-up table values have to be calculated in look-up table generator 65, based on the spiral parameters of the input, before real time output of the test pattern can start. The color look-up table values remain the same during the operation of the generator, while all other signal values are changing with every pixel value. All real time operations are identified in FIG. 5 by CLK signal inputs.

The foregoing disclosure and description of the invention is illustrative and explanatory thereof and various changes in the design and configuration, and the algorithms therewith, may be made within the scope of the appended claims without departing from the spirit of the invention.

We claim:

1. A method for generating a television test pattern correlated to a spiral curve using an addressable color look-up table for providing a color signal in scanning sequence, for each of a plurality of pixels on a television display, said method comprising the steps of, for each pixel:
   a) determining for each pixel position, a rotational angle correlated to a point on the spiral curve; and
   b) selecting said color signal from the look-up table using said rotational angle as an address.

2. The method of claim 1, wherein the television test pattern is generated as a cyclical sequence of frames and the color signal is selected in each frame using said rotational angle plus an offset which is a function of the respective frame number in the sequence.

3. An apparatus for generating a television test pattern correlated to a spiral curve by providing a color signal in scanning sequence, for each of a plurality of pixels on a television display, said apparatus comprising:
   a) an addressable storage means, for storing a plurality of color signals;
   b) means for determining for each pixel position, a rotational angle correlated to a point on the spiral curve; and
   c) means for selecting for each respective pixel a color signal from said storage means using said rotational angle as an address.

4. The apparatus of claim 3 wherein the television test pattern is generated as a cyclical sequence of frames, and said selecting means selects said color signal using said rotational signal plus and offset which is a function of the respective frame number in the sequence.

* * * * *